United States Patent [19]

Sireci

[11] Patent Number: 4,808,768
[45] Date of Patent: Feb. 28, 1989

[54] UTILITY ROUTING SYSTEM FOR MODULAR PANELS

[75] Inventor: Donald J. Sireci, Deerfield, Ill.

[73] Assignee: Richard E. Caragher, Oriole-Morton Grove, Ill. ; a part interest

[21] Appl. No.: 11,289

[22] Filed: Feb. 5, 1987

[51] Int. Cl.⁴ .............................................. H02G 3/28
[52] U.S. Cl. ................................................. 174/48
[58] Field of Search .................. 174/48, 49; 160/127, 160/135, 351; 52/220, 221, 173, 239; 439/215

[56] References Cited

U.S. PATENT DOCUMENTS 4,135,775 1/1979 Driscoll ............................. 439/215
4,308,418 12/1981 VanKuik et al. ..................... 174/48

Primary Examiner—A. C. Prescott
Assistant Examiner—David A. Tone

[57] ABSTRACT

An electrical conductor raceway system for standardized modular wall panels that utilizes receptacle boxes interconnected by fixed length rigid tubular connectors.

17 Claims, 6 Drawing Sheets

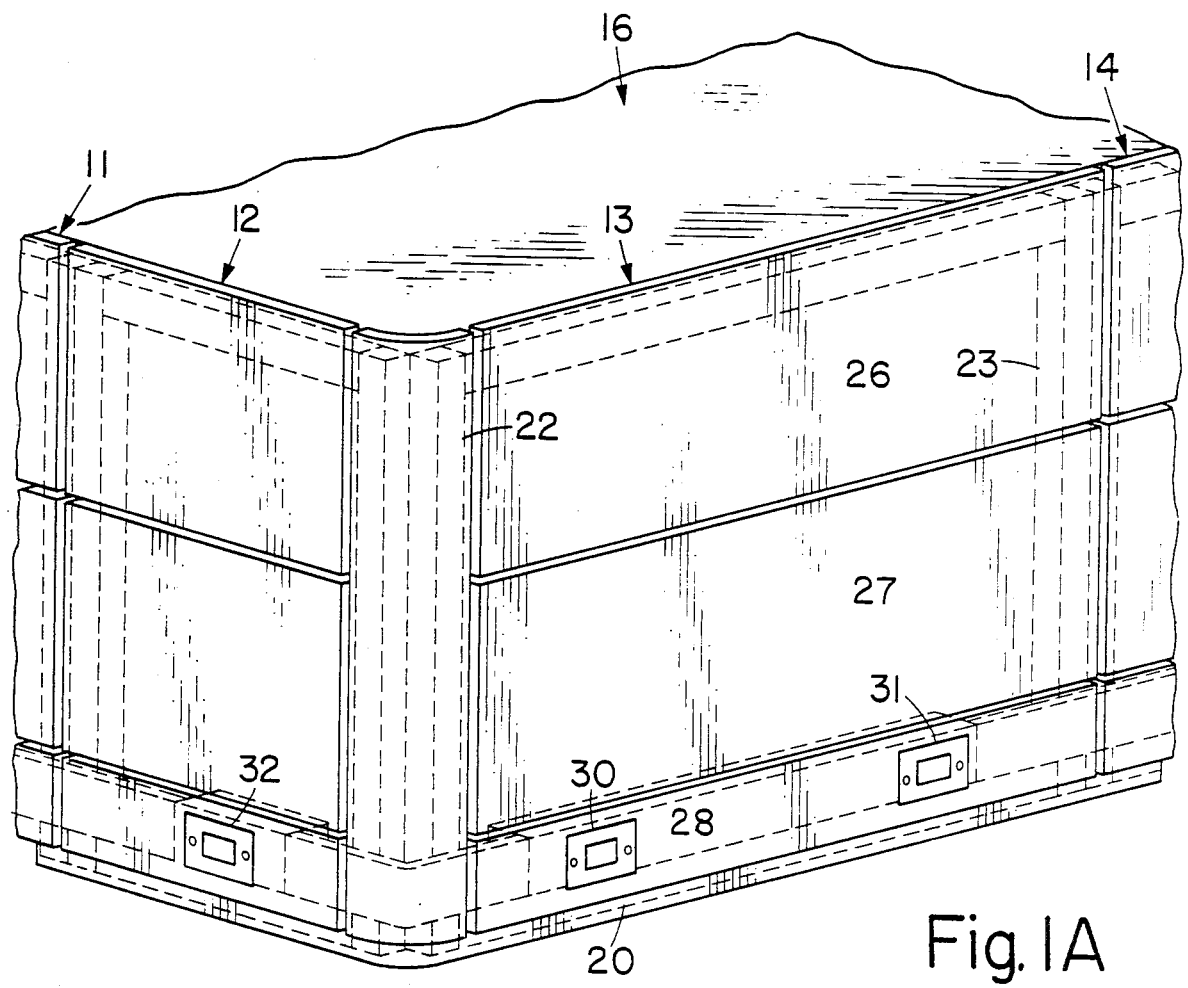
Fig. 1
Fig. 1A
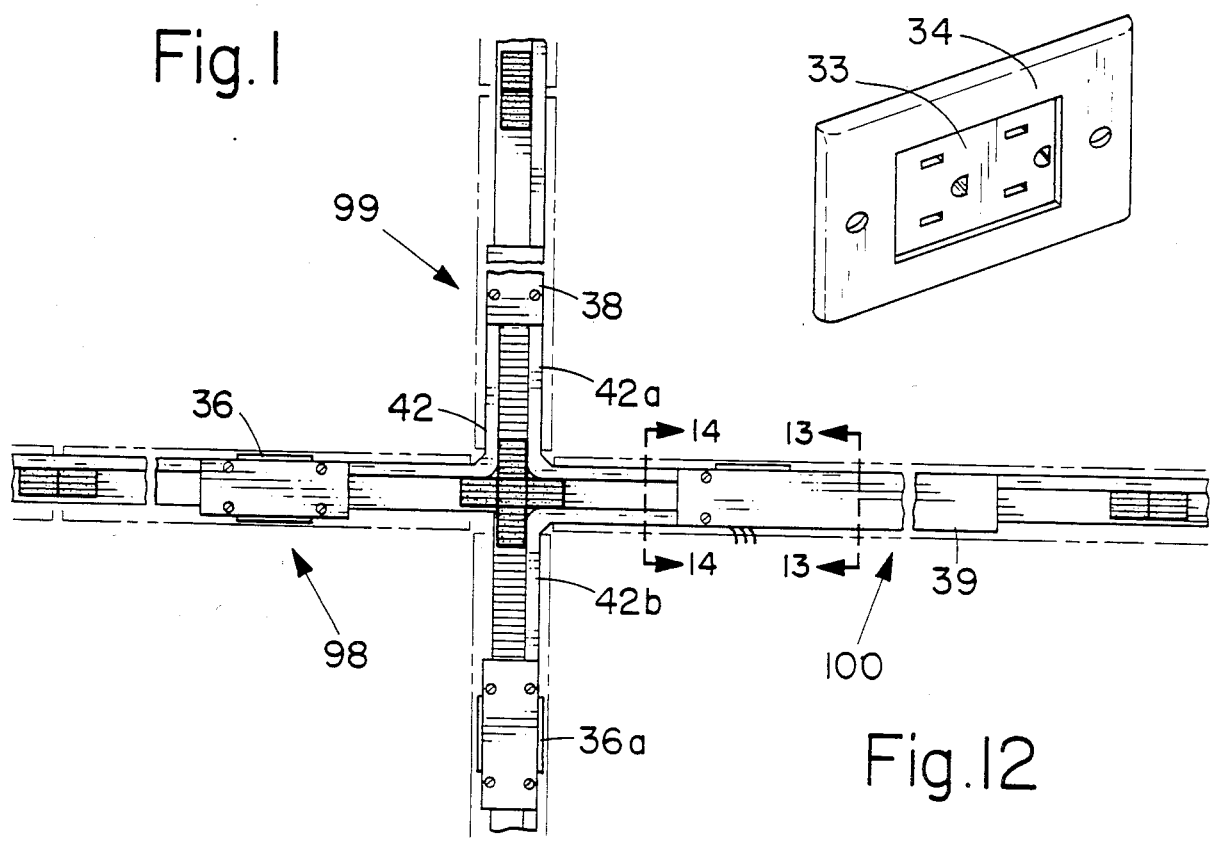
Fig. 12

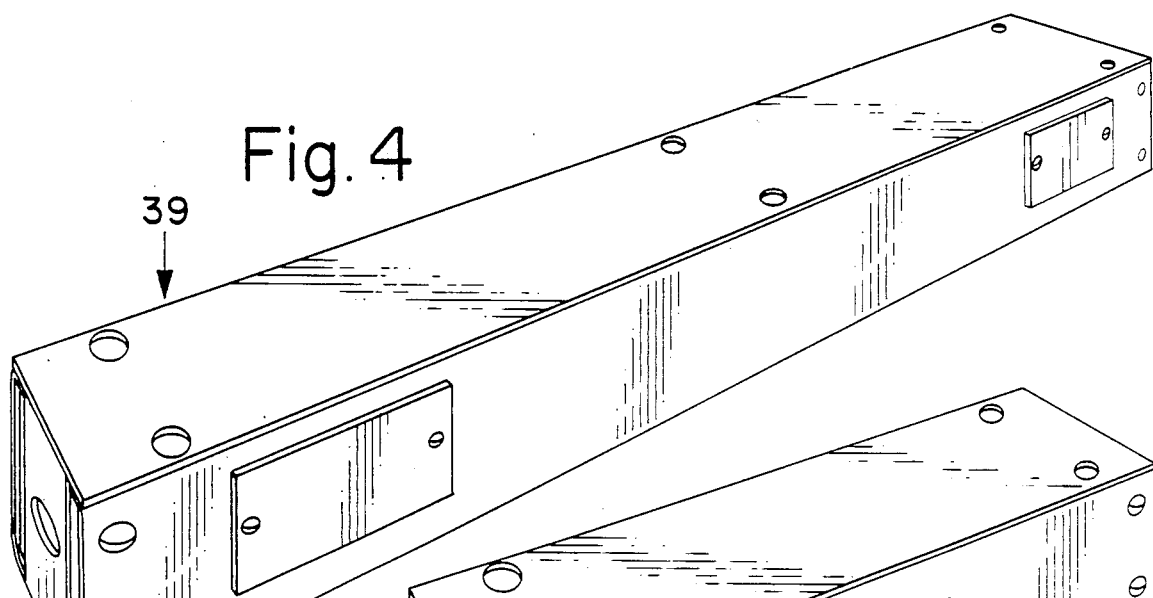
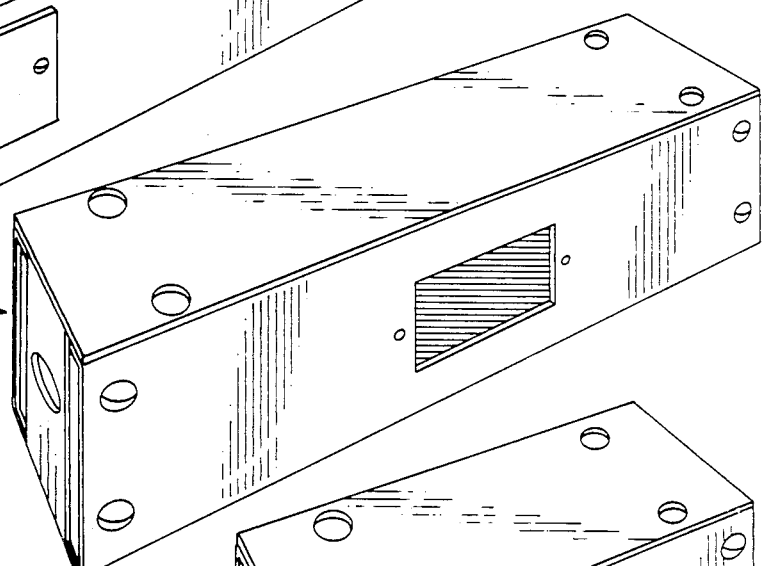
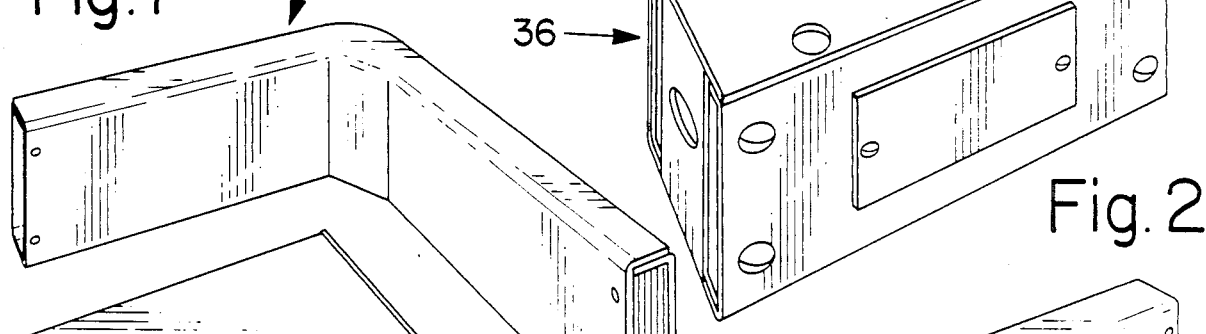
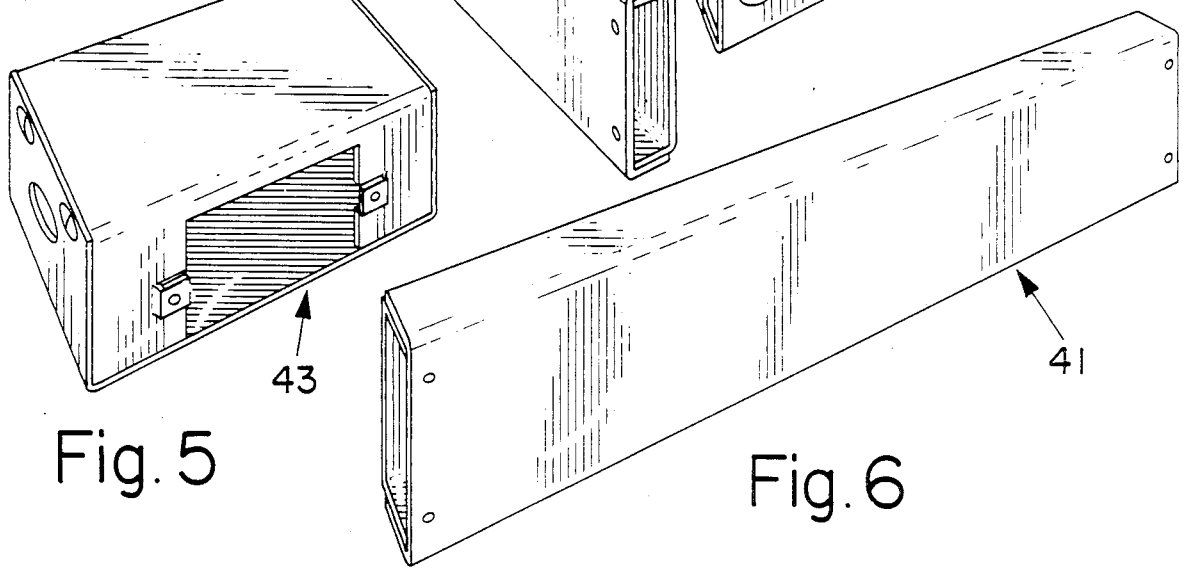

UTILITY ROUTING SYSTEM FOR MODULAR PANELS

BACKGROUND OF THE INVENTION

Modular office systems have become increasingly popular over the last decade for customizing open office space into compartmental individualized semi-private office areas. These systems are particularly useful in modern unpartitioned office buildings where the construction of permanent office or privacy partitions would be quite expensive, particularly where the tenant does not have a sufficiently long term lease to justify the expenditure for the construction of permanent office subdivisions.

These modular office systems basically consist of a plurality of standard vertical panels that are easily connectable to one another in either a straight line, a simple 90 degree corner, a "T" configuration, or a four-way 90 degree crossing configuration. Present day office systems of this type include panels in a plurality of standard widths, for example, 24 inch width, 30 inch width, and 48 inch width. Each of these panels has a rectangular peripheral frame assembly, in some case a ⅝ inch rectangular tubular frame, over which decorative exterior cover panels are mounted. This frame is adapted to carry one or more electrical receptacles on the lower horizontal tubular frame member, and these receptacles are referred to as baseline receptacles. In 48 inch panels there are frequently provided two of these receptacles or receptacle openings, and in the 24 inch and 30 inch panels, one receptacle adaptation is frequently provided. In addition to the baseline receptacle openings or adaptations, these modular panels are provided with an adaptation for a higher receptacle, commonly referred to as a beltline receptacle.

During the installation of these modular office systems, the installing contractor will subcontract to an electrical contractor the job of installing the beltline and baseline receptacles in the frames after the frames have been set up and prior to the addition of the covering panels to the frames. Presently, conventional receptacle boxes are mounted on the frame by the contractor and the boxes are interconnected by either BX cable or conduit. This requires the electrical contractor to measure the distance between receptacles and to cut the BX or conduit to the needed dimensions. This is a particular problem because as noted above the panels have a variety of standard widths. Another problems is that the standard receptacle boxes and conventional wiring techniques are not acceptable in these modular office systems in locales with very strict fire codes.

It is a primary object of the present invention to ameliorate the problems noted above in electrical wiring systems for receptacles in modular office systems.

SUMMARY OF THE PRESENT INVENTION

In accordance with the present invention an electric raceway or routing system is provided for standardized modular office systems that can be installed without the use of any special tools, without cutting any cable or conduit, using only a simple screwdriver.

Toward this end, the present electric routing system includes a plurality of standard baseline boxes, one for each width panel. The baseline box for the 48 inch panel is 32 inches, and has two receptacle mounting locations, the baseline box for the 30 inch panel is 14 inches and has one central receptacle adapter, and the baseline box for the 24 inch panel is 8 inches in length and also has a central receptacle adapter. These baseline boxes are interconnected by standard length tubular connectors regardless of whether the box is a 32 inch box, a 14 inch box or an 8 inch box. There are two standard connectors each approximately 17¼ inches in length, one straight and one a 90 degree corner connector. These connectors enclose the electrical conductors between the baseline box mounted receptacles. The connectors, which are rectangular tubular sections, are all the same length even when connecting a 24 inch panel to a 48 inch panel because the baseline boxes all have a length with a fixed ratio to the width of its associated panel.

Each of the baseline boxes has opposed receptacle openings so that the receptacles face outwardly from both sides of the panel, and each have two rectangular openings in each end thereof to receive and lock a connector, so that each baseline box is adapted to receive two tubular connectors at each end if desired. If less than four connectors are required or desired in a particular box, the unused opening in the box is closed by an L-shaped bracket. There also is provided a knock-out in each end of the box to accommodate a supply line input or a BX cable extending upwardly to a beltline box in the same panel.

After the modular frames are erected, the electrical subcontractor interconnects the boxes with the standard tubular connectors, wires the receptacles together, screws the appropriate sized baseline box to each of the lower frame members with screws that go through the bottom of the boxes into the frame, fastens the receptacles to the boxes, and replaces the covers on the boxes and the installation is complete without the need for any BX or conduit cutting or receptacle box modification.

Other objects and advantages of the present invention will appear from the following detailed description.

BRIEF DESCRIPTION OF THE DRAWINGS

FIG. 1 is a perspective fragmentary view of a corner configuration modularized paneling system;

FIG. 1A is a perspective view of a receptacle and face plate for a panel.

FIG. 2 is a perspective view of a baseline box according to the present invention for a 24 inch modularized panel;

FIG. 3 is a perspective view of a baseline box for a 30 inch modular wall panel;

FIG. 4 is a perspective view of a baseline box for a 48 inch modular wall panel;

FIG. 5 is a perspective view of a beltline box according to the present invention;

FIG. 6 is a perspective view of a standard straight connector according to the present invention;

FIG. 7 is a perspective view of a standard corner connector according to the present invention;

FIG. 12 is a partly schematic top view of a typical four-way corner installation of the present electrical routing system;

DETAILED DESCRIPTION OF THE PREFERRED EMBODIMENT

Figure 8:
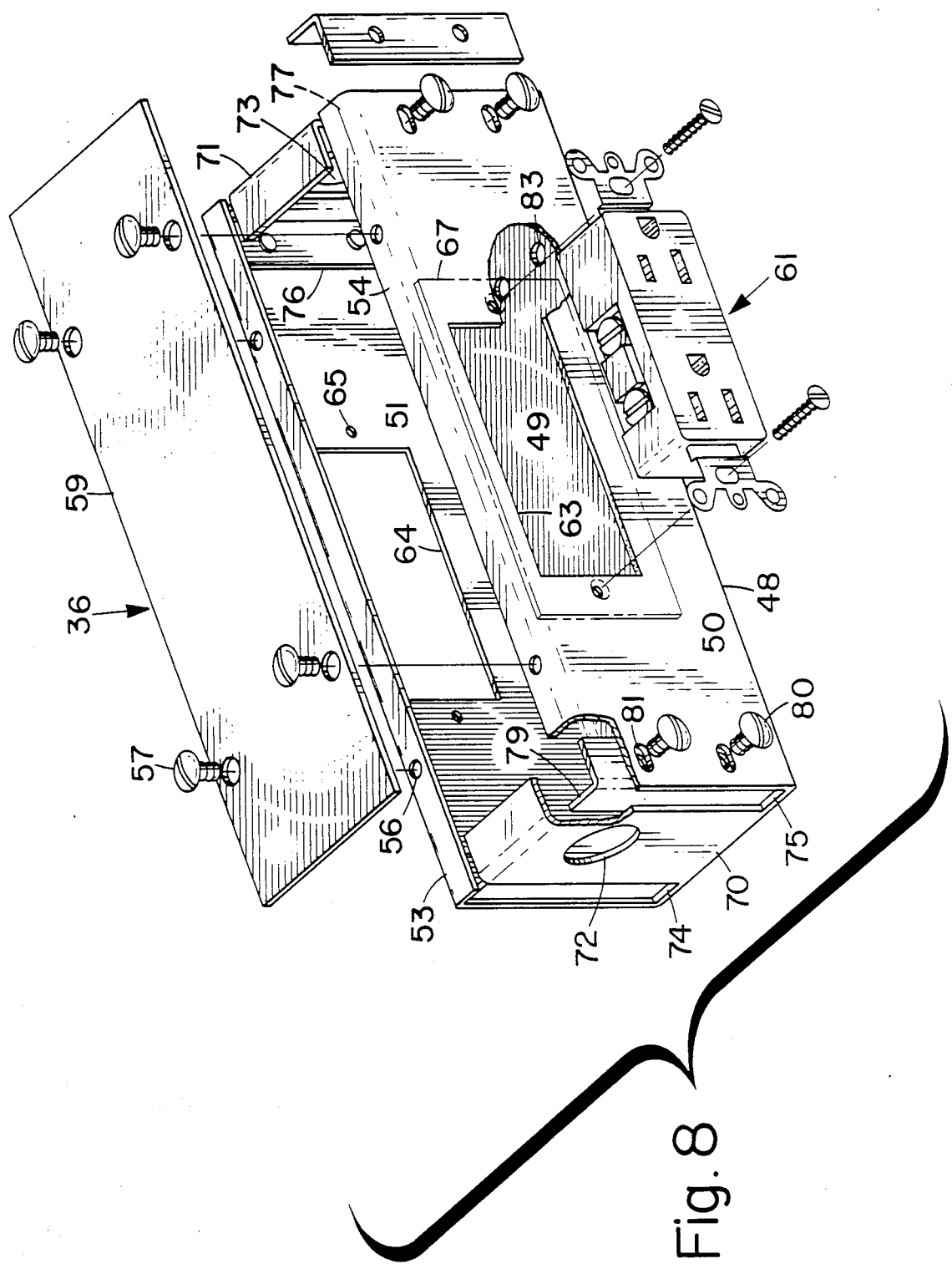
FIG. 8 is an exploded perspective view of the baseline box illustrated in FIG. 2 including a conventional electrical receptacle.

Referring to the drawings and particularly FIG. 1, a small portion of a modular office system is illustrated consisting of interconnected vertical panels 11, 12, 13 and 14. The panels 11, 12, 13 and 14 are constructed in three standard widths of 24 inches, 30 inches and 48 inches, by one manufacturer, and other manufacturers of these systems may have a greater or fewer number of standard width panels. It should be understood, however, that the principles of the present invention are applicable to modular office systems constructed by other manufacturers, as well.

Each of the panels 11, 12, 13 and 14 have similar frames, and panel 13, as an example, includes a lower horizontal tubular rectangular frame member 20 referred to as a baseline frame, and an upper tubular rectangular frame member 24 interconnected by vertical tubular frame members 22 and 23. These frame members have a width of approximately ⅝ inch. These frame members, after assembly to adjacent frame members in the desired custom office configuration, are covered by outer panels 26, 27 and 28 on both sides of the frame members. The lower panel 28 has two receptacle openings 30 and 31 in the 48 inch panel, while the smaller 24 inch and 30 inch panels have a single central lower rectangular receptacle opening 32 therein, all referred to as baseline receptacle openings.

The baseline receptacle openings have a receptacle 33 therein and a face plate 34 thereon.

There are also provided openings (not shown in FIG. 1) in certain of the middle panels 27 for receptacles referred to as beltline receptacles, as will appear hereinafter.

The present electrical routing system for these baseline and beltline receptacles is predominantly mounted on the baseline frame members 20 and extends around the vertical frame members 22 and 23.

As seen in FIGS. 2, 3, 4, 5, 6 and 7, the basic elements of the present routing or raceway system include a baseline box 36 adapted to be utilized with 24 inch modular panels, a baseline box 38 adapted to be used in 30 inch panels, a four receptacle baseline box 39 adapted to be used with 48 inch modular panels, a straight tubular connector 41 and a 90 degree tubular connector 42 (both for interconnecting the boxes 36, 38 and 39), and a beltline box 43.

The 24 inch panel baseline box 36 is 8 inches in length, the 30 inch panel baseline box 38 is 14 inches in length, and the 48 inch panel baseline box 39 is 32 inches in length. The straight tubular connector 41 is 17¼ inches in length, and each leg of the right angle tubular connector 42 is 8¾ inches in length (approximately 17¼ inches total length). This fixed difference between the length of the boxes 36, 38 and 39 and the width of the standard 24 inch, 30 inch and 48 inch panels, permits the standard length connectors 41 and 42 to be utilized to interconnect boxes 36, 38 and 39 without cutting or modifying the connectors in any way. With the exceptions of the fact that the boxes 36 and 38 are two receptacle baseline box while the baseline box 39 is a four receptacle baseline box, and the different length of the boxes, each of the baseline boxes is identical, so that the following detailed description of baseline box 36 described in connection with FIG. 8 should be understood to apply to the baseline boxes 38 and 39, as well.

Referring to FIG. 8, baseline box 36 is seen to include a "U" shaped housing 48 consisting of a bottom panel 49 (see FIG. 14), upwardly extending side panels 50 and 51, and top flanges 53 and 54 extending transversely from side panels 51 and 50 respectively.

Side panel 50 has a rectangular receptacle opening 63, and side panel 51 has an identical receptacle opening 64 therein. The openings 63 and 64 have adjacent holes 65 for the purpose of attaching a receptacle 61 in the opening or alternatively attaching a cover plate 67 over the opening.

The housing 48 also includes integral upstanding vertical end walls 70 and 71 with knockouts 72 and 73 therein for the purpose of accommodating either a supply power cable or a BX cable to a beltline box in the same modular panel. The side walls 50, 51 are spaced 3 inches, and the end walls 70, 71 have a width of 1½ inches, leaving rectangular openings 74, 75, 76 and 77 with a width of approximately ¾ inch each and a height of approximately 3 inches. These openings 74, 75, 76 and 77 are sized to slidably, but snugly, receive the connectors 41 and 42.

In the event one of the openings 74, 75, 76 or 77 does not receive a connector 41 or 42, then this opening is closed by an "L" shaped bracket 79 attached to one of the side walls 50 or 51 by fasteners 80 that extend through apertures 81 in the side walls into apertures in the brackets 79.

Figures 13, 14:
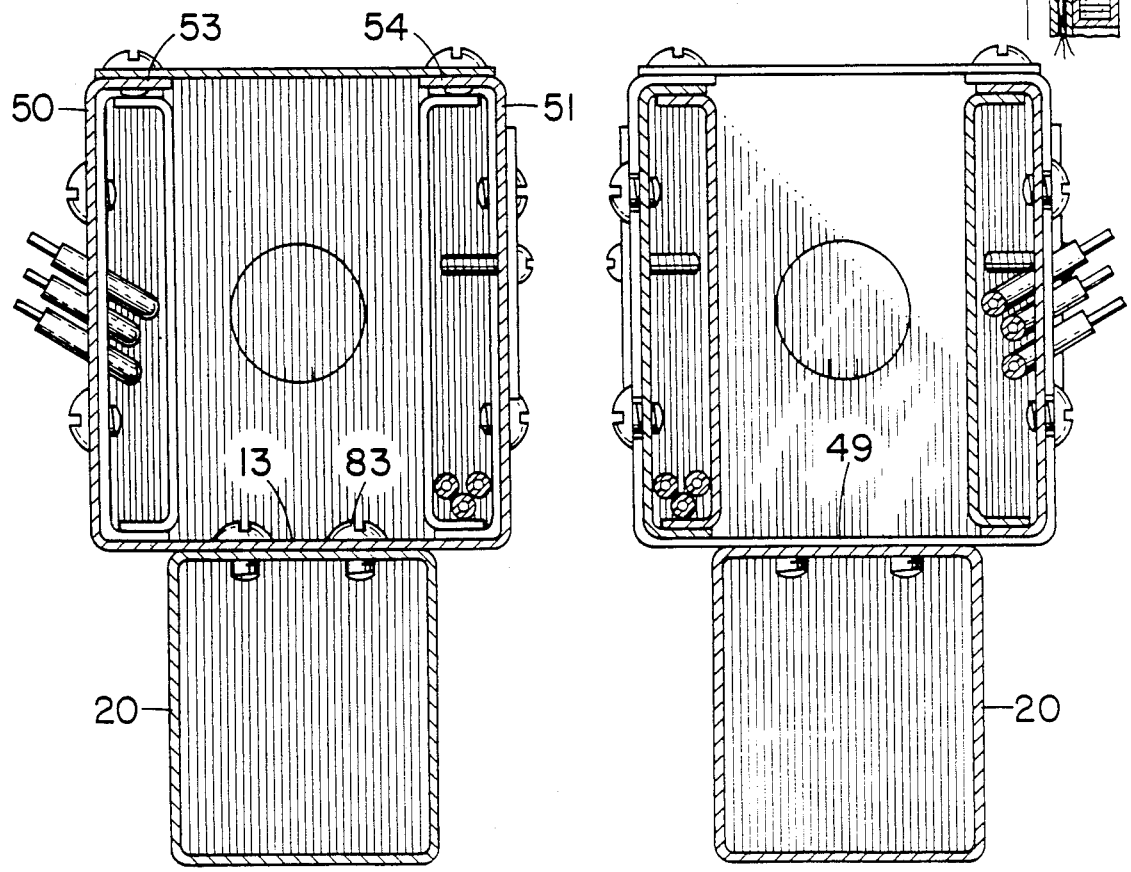
FIG. 13 is a cross-section illustrating the interior of one of the baseline boxes taken generally along line 13—13 of FIG. 12; and, FIG. 14 is a cross-section illustrating the end of one of the baseline boxes taken generally along line 14—14 of FIG. 12.

The baseline boxes have apertures 83a in bottom wall 49 that receive fasteners for attaching the boxes to the upper surface of the lower frame members 20 as seen clearly in FIGS. 13 and 14.

Figure 9:
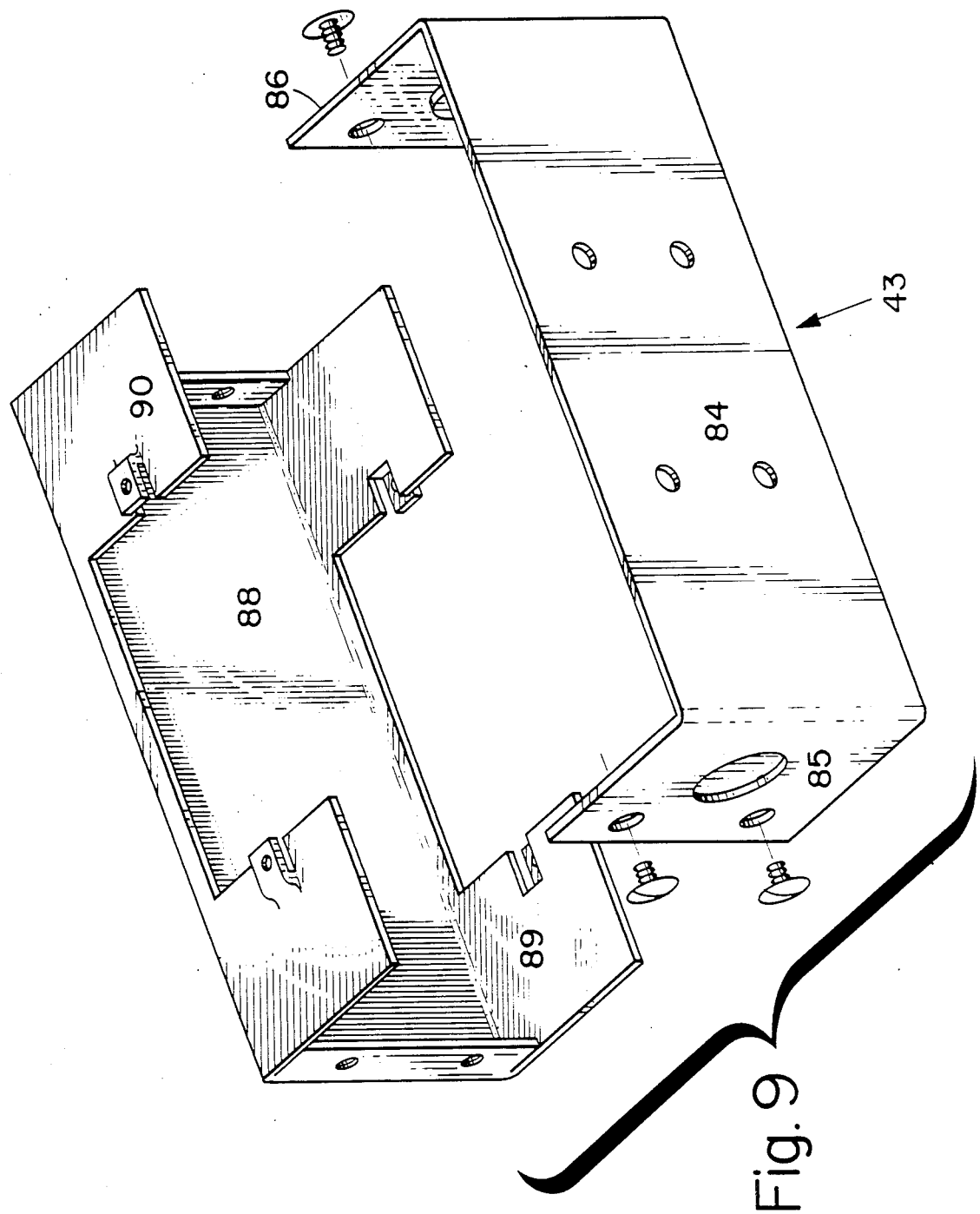
FIG. 9 is an exploded perspective view of the beltline box illustrated in FIG. 5.

As seen in FIG. 9, the beltline box 43 includes a base portion with a bottom wall 84 and upstanding side walls 85 and 86 having knockouts in each adapted to selectively receive a BX cable from one of the baseline boxes 36, 38 or 39. The base is covered by an inverted "U" shaped cover closure having a top wall 88 and depending side walls 89 and 90 each having an opening adapted to receive a receptacle. The beltline box 43 is adapted to be connected to a horizontal frame member that is unshown in FIGS. 1 and 10, but extends mid-panel approximately 32 inches from the floor.

Figure 10:
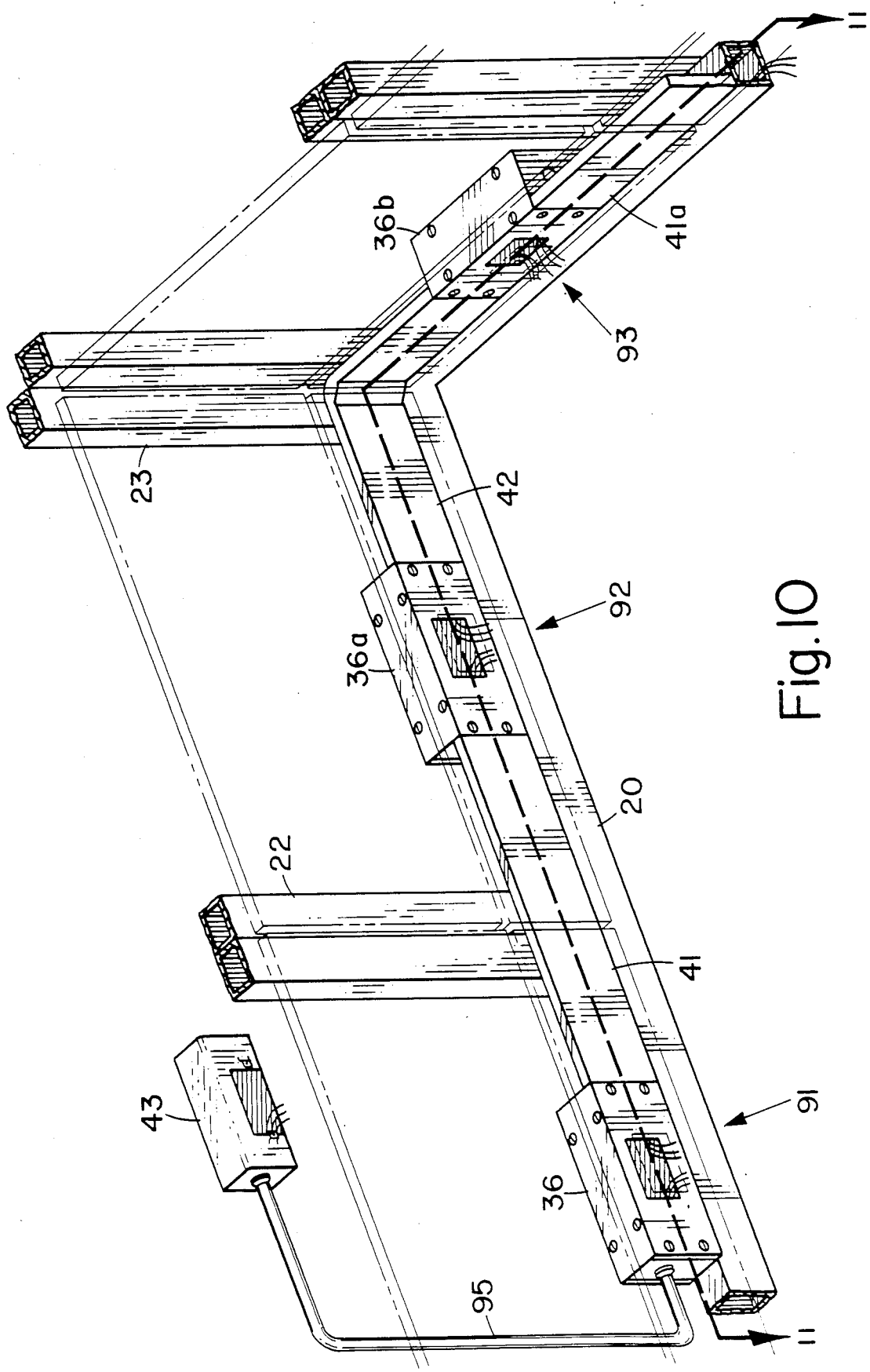
FIG. 10 is a perspective view of a typical corner installation of the present electrical routing system.
Figure 11:
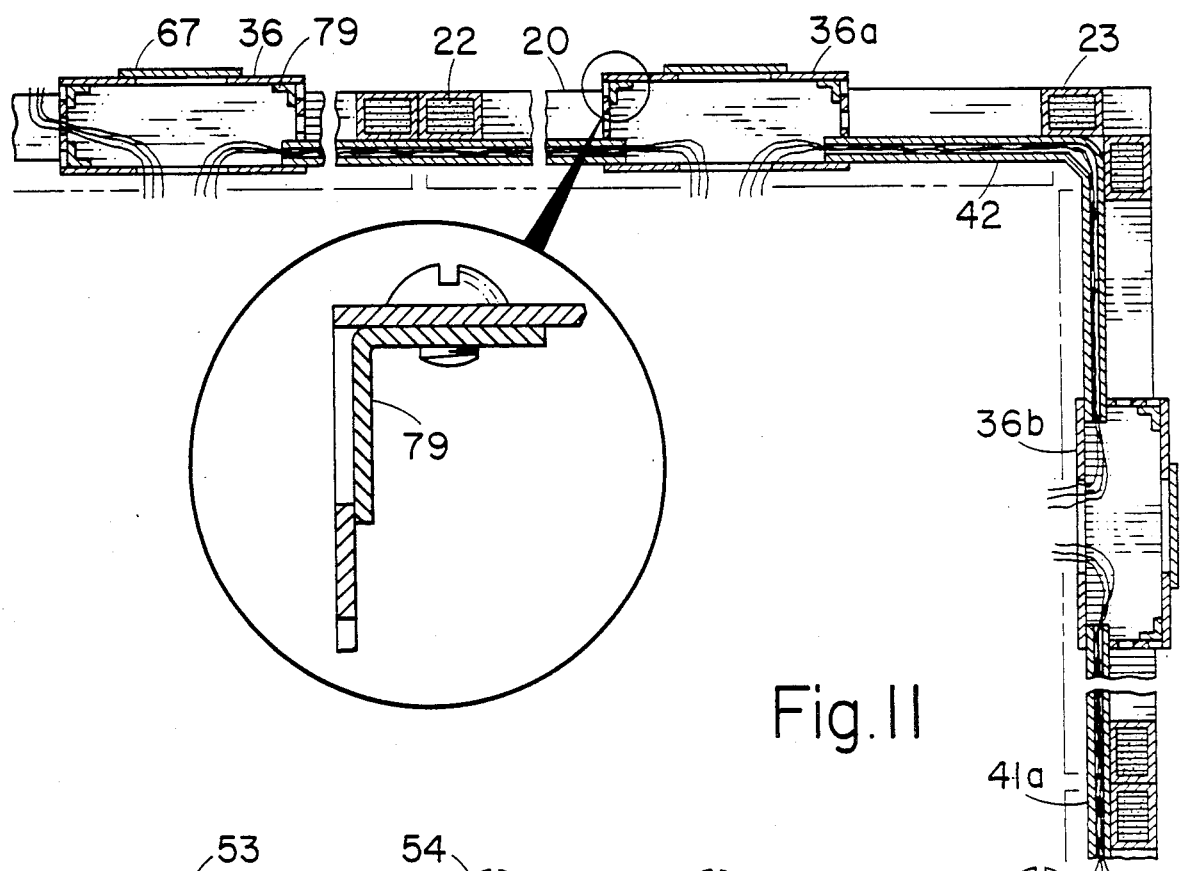
FIG. 11 is a fragmentary longitudinal section of the typical corner installation taken generally along line 11—11 of FIG. 10.

FIGS. 10 and 11 illustrate a typical installation of the present routing system at a corner juncture between several 24 inch panels utilizing the 24 inch panel baseline boxes 36, 36a and 36b interconnected by a straight connector 41, a right angle connector 42, and another straight connector 41a. While the installation shown in FIGS. 10 and 11 is limited to 24 inch panels, it should be understood that the 24 inch panels can be connected adjacent to 30 inch panels and 48 inch panels simply by utilizing the baseline boxes 38 and 39 respectively in these larger panels.

As seen in FIGS. 13 and 14, the baseline boxes overhang the tubular base members 20 by the width of the openings 74, 75, 76 and 77 in the boxes so that the connectors 40, 41, when inserted into these openings, just pass the vertical frame members 22 and 23 without interfering with the vertical frame members and without increasing the width of the standard panels because the bottom panels 28, as seen in FIG. 1, are spaced apart sufficiently to accommodate the 3 inch width of the present routing system.

After the baseline boxes 36, 36a and 36b are fitted with the interconnecting connectors 41, 42, the boxes are attached to the frame members 20 by fasteners 83. After wiring and installing the receptacles to the boxes, the cover plates 59 are attached to the boxes completing the assembly. Beltline boxes 43 may also be wired, if desired, utilizing a BX cable, such as shown at 95 in FIG. 10.

FIG. 12 illustrates a typical four-way panel intersection utilizing the short baseline box 36 in 24 inch panel 98, the intermediate length baseline box 38 in 30 inch panel 99, and the 32 inch baseline box 39 in 48 inch panel 100. The length of the boxes 36, 38 and 39 permits the standard corner connectors 42, 42a and 42b to interconnect the boxes without the need for any cutting or machining.

I claim:

1. An enclosed electrical conductor routing system for standardized modular panels having a plurality of frame widths, comprising: a first plurality of baseline boxes having a predetermined length adapted to receive an electric receptacle, said first plurality of boxes being adapted to be connected to a first standard panel frame having a predetermined width, a second plurality of baseline boxes having a predetermined length greater than the first baseline boxes adapted to be connected to standard panel frames having a predetermined width greater than the width of the first panel frames, a plurality of fixed and equal length rigid tubular connectors interconnecting some of the first baseline boxes to one another, a plurality of the same connectors interconnecting some of the second baseline boxes to one another, and a plurality of the same connectors interconnecting some of the first baseline boxes to some of the second baseline boxes whereby the system can be installed without bending or cutting, said baseline boxes having front and rear walls and an end wall at each end thereof, each of said baseline boxes having at least one opening on each end wall thereof offset from the center of the end wall immediately adjacent one of the front and rear walls, said rigid tubular connectors being constructed to connect to the baseline boxes at the baseline box end wall openings to avoid interference with panel frames.

2. An enclosed electrical conductor routing system for standardized modular panels having a plurality of frame widths, as defined in claim 1, wherein the first and second baseline boxes have at least one rectangular opening at each end thereof adapted to closely receive a standard connector, said connectors being rectangular and sized to fit in the rectangular box openings.

3. An enclosed electrical conductor routing system for standardized modular panels having a plurality of frame widths, as defined in claim 1, wherein each baseline box has two openings at each end thereof so that it can receive two connectors at each end thereof, and means for selectively closing any one of the openings in the baseline boxes not being used.

4. An enclosed electrical conductor routing system for standardized modular panels having a plurality of frame widths, as defined in claim 1, wherein each baseline box has a top cover to facilitate closing the boxes.

5. An enclosed electrical conductor routing sytem for standardized modular panels having a plurality of frame widths, as defined in claim 1, wherein the connectors are straight.

6. An enclosed electrical conductor routing system for standardized modular panels having a plurality of frame widths, as defined in claim 1, wherein the connectors have a 90 degree bend therein.

7. An enclosed electrical conductor routing system for standardized modular panels having a plurality of frame widths, as defined in claim 1, wherein some of the connectors are straight, and some of the connectors have 90 degree bends therein to accommodate panel frames positioned at 90 degrees with respect to one another.

8. An enclosed electrical conductor routing system for standardized modular panels having a plurality of frame widths, as defined in claim 1, wherein each of the boxes has a receptacle opening on each of the front and rear sides thereof.

9. An enclosed electrical conductor routing system for standardized modular panels having a plurality of frame widths, comprising: a first plurality of baseline boxes having a predetermined length adapted to receive an electric receptacle, said first plurality of boxes being adapted to be connected to first standard panel frames having a predetermined width, a second plurality of baseline boxes having a length greater than the first baseline boxes adapted to be connected to second standard panel frames having a predetermined width greater than the width of the first panel frames, and a plurality of standard fixed and equal length rigid tubular connectors interconnecting the baseline boxes, said baseline boxes having front and rear walls and an end wall at each end thereof, each of said baseline boxes having at least one opening in each end wall thereof offset from the center of the end wall immediately adjacent one of the front and rear walls, said rigid tubular connectors being constructed to connect to the baseline boxes at the baseline box end wall openings to avoid interference with panel frames.

10. An enclosed electrical conductor routing system for standardized modular panels having a plurality of frame widths, comprising: a plurality of fixed length baseline boxes adapted to receive receptacles, adapted to be mounted centrally on the panel frames, and a plurality of fixed length rigid tubular connectors adapted to receive electrical conductors, said connectors interconnecting the baseline box adapted for one frame to the baseline box adapted for another frame, said baseline boxes having front and rear walls and an end wall at each end thereof, each of said baseline boxes having at least one opening on each end wall thereof offset from the center of the end wall immediately adjacent one of the front and rear walls, said rigid tubular connectors being constructed to connect to the baseline boxes at the baseline box end wall openings to avoid interference with panel frames.

11. An enclosed electrical conductor routing system for standardized modular panels having standard width frames, as defined in claim 10, wherein the connector receiving openings in the boxes are rectangular with the major axis thereof being positioned vertically, said connectors being rectangular and complementary to the rectangular openings in the boxes.

12. An enclosed electrical conductor routing system for standardized modular panels having standard width frames, as defined in claim 11, wherein the baseline boxes overhang both sides of the panel frames and each has two rectangular openings at each end thereof adapted to receive connectors, and a plurality of standard plates adapted to close the unused openings in the baseline boxes.

13. An enclosed electrical conductor routing system for standardized modular panels having standard width frames, as defined in claim 10, wherein said baseline box has a top cover to facilitate wiring the boxes.

14. An enclosed electrical conductor routing system for standardized modular panels having standard width frames, as defined in claim 10, wherein the connectors are straight.

15. An enclosed electrical conductor routing system for standardized modular panels having standard width frames, as defined in claim 10, wherein the connectors have a 90 degree bend therein.

16. An enclosed electrical conductor routing system for standardized modular panels having standard width frames, as defined in claim 10, wherein some of the connectors are straight, and some of the connectors have 90 degree bends therein to accommodate panel frames positioned at 90 degrees with respect to one another.

17. An enclosed electrical conductor routing system for standardized modular panels having standard width frames, as defined in claim 10, wherein each of the boxes has a receptacle opening on each of the front and rear sides thereof.

* * * * *